United States Patent Office 2,824,833
Patented Feb. 25, 1958

2,824,833
ACIDIZING WELLS

Paul H. Cardwell and Louis H. Eilers, Tulsa, Okla., assignors to The Dow Chemical Company, Midland, Mich., a corporation of Delaware No Drawing. Application May 11, 1953
Serial No. 354,415

20 Claims. (Cl. 252—8.55)

The invention relates to acidizing wells drilled into the earth. It more particularly concerns an improved hydrochloric acid composition for acidizing wells and method of increasing the output of oil and gas wells by the injection into the contiguous earth of an aqueous solution containing hydrochloric acid.

In the usual well acidizing operation, as for the purpose of increasing the output of a well, the hydrochloric solution with or without fortification with a soluble fluoride is introduced into the well, and, when sufficient pressure is available or supplied, and the formation is sufficiently permeable, the acid also enters the adjacent earth formation. Acid-soluble matter of the earth contacted by the acid is attacked and dissolved away, thereby increasing the size of the well hole and enlarging the interstices of the adjacent formation through which the earth fluids reach the well. In some cases, sufficient pressure may be applied to the acid solution in the well hole to cause the acid to fracture and lift the overlying earth adjacent to the well, thereby forming passageways in the earth by hydraulic action and subjecting them to the solvent action of the acid. Essentially the same acidizing operations are performed in increasing the receptiveness of injection wells. The effectiveness of the conventional acidizing operation to increase the productiveness of a well (or to increase the receptivity of an injection well for fluid), we have found, appears to depend at least in part upon the nature of the solvent action of the acid. According to our investigations, including numerous tests on cores taken from calcareous formations, the conventional hydrochloric acid solution used in well acidization, when forced into and through a more or less fluid permeable core comprising acid-soluble matter, attacks the core mostly at the face exposed to the acid solution and rapidly dissolves it away. At the same time, some of the acid permeates the innumerable interconnected pores or interstitial spaces in the body of the core and becomes spent therein, thereby more or less increasing the flow capacity of the core. The resulting increased capacity for fluid flow, under a given pressure head, is not as great as it would be, if, instead of either enlarging each of the innumerable pores of the interstitial space or attacking the face of the formation, as in conventional acidizing, the acid were to expend itself in only a few of the existing pores so as to form a few large passageways from the well hole deeply into the earth formation. In addition, by forming fewer but larger passageways, and not expending itself either on the face of the formation or throughout the interstitial spaces therein, a smaller quantity of acid would suffice to form passages reaching farther into the formation before becoming spent. It is a desideratum of the art to overcome the shortcomings of conventional acidizing and to achieve greater effectiveness of the action of the acidizing solution.

It is, therefore, an object of the invention to provide an improved acid composition for and method of acidizing wells in which the tendency for the acid to become ineffectively expended in attacking the wall of the well hole as well as becoming ineffectively dissipated in multitudes of interconnected pores in the adjacent formation is overcome, if not substantially reduced. Other objects and advantages will become apparent as the description of the invention proceeds.

The invention involves the discovery that by including in the hydrochloric acid solution, which is injected into the earth formation adjacent to the well in the acidizing operation, between about 1.1 and 2.7 percent by weight of certain water-soluble gums which at least temporarily thicken or increase the viscosity of the acid solution, the gum being previously moistened with a water-insoluble liquid dispersible in the acid solution so as to coat the particles of gum with the liquid, the hydrochloric acid solution no longer permeates the entire interstitial space in the earth formation into which the solution is injected, but instead becomes selective in its action in that it permeates the earth formation only in a comparatively few places per unit of area of the earth formation exposed to the acid solution in the well hole. The acid solution containing the water-soluble gum, in accordance with the invention, has the peculiar property of entering and greatly enlarging only a few of the pores in the earth formation being acidized. The pores thus enlarged become passageways which have the appearance of "worm holes" and have a more or less uniform diameter, the diameter of most of them being between about 0.05 and 0.3 inch. These worm holes extend from the face of the well hole through which the acid enters the formation and penetrate deeply into the formation, and the face of the formation, through which the acid passes in leaving the well hole and going into the formation, is but slightly eaten away. The passageways thus formed are usually branched. Sometimes one or more branches form from a single passageway entering the face of the formation and sometimes two or more passageways, formed at the entering the face of the formation, will combine into a single passageway as the passageways lengthen. While the formation becomes thus acidized, the acid decomposes more or less of the gum, and, as the acid becomes fully spent in the passageways or worm holes so made more or less undecomposed gum may remain as a deposit on the walls of the worm holes. Nevertheless, as a result of the acidizing, the fluid permeability of the formation is greatly increased. If desired, gum-free hydrochloric acid solution may be injected into the formation after or behind the gum-containing acid to assist in decomposing in the formation gum which might tend to reduce the flow capacity of the worm holes. Examples of water-soluble gums which we have found to produce these desirable effects in hydrochloric acid solution when suitably moistened with a water-insoluble liquid as aforesaid are gum karaya, carrageenin (Irish moss), psyllium seed, gum ghatti, gum tragacanth, gum pershir, and gum shiraz.

It has been further discovered that by increasing the viscosity of the hydrochloric acid solution to a comparatively high range of viscosities, e. g. 1000 cps. to 51,000 cps., by using at least one of the aforesaid water-insoluble liquid moistened gums in amount exceeding 2.7 percent by weight, and applying very high pressures to the so-thickened acid solution, i. e. pressures exceeding the weight per unit area of the overburden of earth above the formation being acidized, a hydraulic jacking action is readily obtained without either excessive penetration into or wastage of the acid in the interstitial space. Upon releasing the pressure after the injection, the formation is left deeply channeled and fractured and in a condition either to produce or receive fluid more readily. Undecomposed gum remaining in the formation after an injection of the gum-containing acid may be decomposed by introducing into the formation a charge of gum-free hydrochloric acid as aforesaid. For this purpose, there may be used a volume of gum-free hydrochloric acid (containing 2 to 25 percent of HCl) which is from about 2 to 25 times the volume of the gum-thickened acid used. A preferred amount to use is about 6 volumes of gum-free acid for each volume of gum-thickened acid with gum concentrations in the gum-thickened acid of between 1.1 and 2.7 percent; and about 2 volumes of gum-free acid for each volume of gum-containing acid when the concentration of the gum-containing acid exceeds 2.7 percent. In formations which are largely of sand or acid-insoluble material, the gum generally decomposes in due time before the acid becomes spent without the need for an injection of gum-free acid behind the gum-containing acid.

In carrying out a well treatment according to the invention, the aqueous hydrochloric acid solution used may contain from about 2 to 25 percent of HCl by weight, a concentration of about 10 to 15 percent of HCl being preferred. The acid solution is more or less thickened by dispersing therein a water-soluble gum which is first moistened with a suitable non-aqueous liquid capable of being dispersed in the acid solution and is inert to the gum. Suitable non-aqueous liquids are those which readily wet the gum without decomposing it and are more or less insoluble in, as well as substantially inert to, the aqueous hydrochloric acid solution to be used. Liquids which are oily in nature are generally suitable. For example, there may be employed petroleum oil especially the fractions boiling in the range from petroleum ether to the lubricating oils: specifically kerosene, benzine, and motor lubricating oil, e. g. SAE No. 30. The liquid chlorinated hydrocarbons having molecular weights of 85 to 300 form another class of suitable non-aqueous liquids. Specific examples in this class are carbon tetrachloride and orthodichlorobenzene. Other classes of organic liquids, which wet the gums, are water-insoluble or nearly so and inert to the gums which may be used are alcohols and ketones having carbon atom to oxygen atom ratios of 5 to 11 and molecular weights in the range of 85 to 175. Specific examples of such liquids are amyl alcohol and diethyl ketone.

The non-aqueous liquid is used in an amount sufficient to moisten or wet the gum so that on stirring the non-aqueous-liquid-wetted gum into the hydrochloric acid solution the gum becomes uniformly dispersed therein without gelling or balling up as it does in the absence of prior wetting by the non-aqueous liquid. The amount of non-aqueous liquid to use is not sharply critical and readily determined by trial. If insufficient of the non-aqueous liquid be used the gum balls up and forms gellied masses not uniformly dispersed in the acid and these masses block the flow of the acid solution into the earth formation. In determining the amount of non-aqueous liquid to use, it becomes evident in trial tests that a wide range of proportions will produce a non-aqueous liquid gum-mixture which is readily dispersible in the hydrochloric acid without gelling and balling up provided a certain minimum amount of the liquid is used. The minimum varies with the kind of gum as well as the kind of non-aqueous liquid. For example, we have found that a given weight of gum karaya may be wetted and rendered uniformly dispersible in the acid solution by an amount of kerosene which is about 70 percent of the weight of the gum. Larger amounts may be used such as up to several times the weight of the gum. When an excessive amount of the non-aqueous liquid is used, much of it washes off the gum as the liquid moistened gum is dispersed in the acid solution forming a second liquid phase in the acid solution which separates on standing. When the non-aqueous liquid is relatively light compared to the acid solution, the non-aqueous liquid rises to the top forming a floating layer which is of no known value in the subsequent use of the acid solution in the treatment of the earth formation. Hence, as a guide in determining the maximum amount of non-aqueous liquid with which to wet the gum a series of mixtures of gum and non-aqueous liquid may be made using increasing amounts of the non-aqueous liquid until a proportion is found which is under that producing a second liquid phase on settling the mixture after dispersion. In general, amounts of non-aqueous liquid which are between the extremes of insufficiency, as evidenced by balling up and gelling, and excessive amounts, as evidenced by stratification into two liquid phases on settling, are used. For example, a generally suitable amount of the non-aqueous liquid is a weight about equal to the weight of the gum used.

Dispersal of the wetted or moistened gum in acid solution may be effected in any convenient manner as by simply stirring the acid solution while adding the non-aqueous liquid-wetted gum thereto and continuing the stirring, if necessary, to uniformly disperse the gum in the acid solution. As a result of the dispersion of the gum, the acid becomes more viscous depending upon the relative amount of gum and acid solution. For forming pasageways or worm holes, without resorting to the use of treating pressures as high as those required for earth lifting, suitable concentrations for the gum are between 1.1 and 2.7 percent or preferably about 2.2 percent by weight of the acid solution. In using well treating pressures sufficiently great to lift the overburden of earth, the gum concentration is preferably increased to as much as 8 percent by weight, about 4.3 percent being preferred.

The following tabulation of viscosity data of an aqueous hydrochloric acid solution to which gum karaya has been added is illustrative of the viscosities attainable with various concentrations of the gum. In making up the gum-acid mixtures of Table I, the gum was first mixed with about an equal weight of kerosene and the kerosene-wetted gum was then dispersed in the acid by stirring.

*Table I*

| Percent Gum by weight | Viscosity of 15% HCl at 150° F., centipoises |
|---|---|
| 1.11 | 100 |
| 2.78 | 500 |
| 3.34 | 1,000 |
| 5.00 | 5,000 |
| 5.73 | 10,000 |
| 6.83 | 30,000 |

The temperature at which the acid solution is used is that to which it becomes heated by the earth formation, the temperature of which generaly is from about 32° F. to 220° F., and sometimes higher, depending upon the location of the formation to be treated. The acid solution need not be heated before injection into the earth as the earth itself may be relied upon for heating the solution.

After the acid solution containing the gum material is injected into the earth formation, sufficient time is allowed for the acid to act and then the injection pressure, if any, may be released. The gum in the gum-thickened acid solution usually partially decomposes while the acid acts upon the formation. The rate of thinning of the unspent acid solution, which is a measure of the rate at which the gum is decomposed by the acid, is influenced by its temperature as exemplified in Table II, the data in which was obtained on 7.5 percent HCl solutions. In making up these gum-acid mixtures, the gum was first mixed with about an equal weight of kerosene and the kerosene-gum mixture was dispersed in the acid solution by stirring.

Table II

| Temperature of thickened acid solution, °F. | Time required to thin, hours |
| --- | --- |
| 100 | 9.5 |
| 140 | 1.5 |
| 180 | 0.5 |
| 220 | 0.2 |

From Table II, it is manifest that the thinning time is shorter the higher the earth temperatures.

The data in the following Table III are illustrative of the amounts of a suitable gum which are required to produce various initial viscosities of acid solutions at some representative temperatures encountered in deep wells. Viscosities at other temperatures and gum concentrations may be estimated by interpolation and extrapolation.

Table III

| Lbs. of gum karaya [1] per 1,000 gallons of acid solution | Viscosity in centipoises | | | |
| --- | --- | --- | --- | --- |
| | 125° F. | 150° F. | 175° F. | 200° F. |
| 170 | 360 | 200 | 150 | 110 |
| 200 | 500 | 300 | 200 | 150 |
| 300 | 1,600 | 940 | 610 | 440 |
| 400 | 5,000 | 2,800 | 1,800 | 1,300 |
| 500 | 15,500 | 8,500 | 5,400 | 3,800 |

[1] Gum moistened with about an equal weight of kerosene before dispersal in acid solution.

The thinning time of other gum-acid mixtures, within the scope of the invention, differs to some extent from gum karaya-acid mixture as illustrated by the data in Table IV. In these tests, the gum was mixed with about an equal weight of kerosene before dispersal in the acid solution.

Table IV

| Gum | Percent Gum in 10% HCl | Viscosity, cps. as made | Temp., °F. | Thinning time, minutes |
| --- | --- | --- | --- | --- |
| Irish moss | 4 | 6,000 | 125 | 15 |
| Psyllium seed | 10 | 500 | 150 | 15 |
| Gum ghatti | 20 | 2,400 | 125 | 30 |
| Gum tragacanth | 10 | 9,000 | 150 | 120 |
| Pershir | [1] 6 | 3,900 | 150 | 45 |
| Shiraz | [1] 6 | 2,750 | 150 | 55 |

[1] In 7.5% HCl.

The following tests, the data of which are tabulated in Table V, are illustrative of the worm-hole forming action of the gum-thickened acid of the invention on calcareous formations. Cylindrical cores 1 inch in diameter and 1 inch long were cut from Bedford limestone and used in the tests. Before acidizing, the cores had a permeability which allowed the passage from end to end of the core of 0.05 cc. of oil (2 cps. viscosity) per minute at a pressure of 1 pound per square inch. In the acidization, 50 cc. of hydrochloric acid solution at the temperatures indicated and containing various amounts of HCl and gum (karaya) as noted in the table and wetted with about an equal weight of kerosene before dispersal in the acid solution, were applied to each core under 60 p. s. i. pressure from one end, the other end being open to the atmosphere.

Table V

| Core No. | Acidizing Temp., °F. | Percent HCl in solution | Lbs. gum per 1,000 gallons acid solution | Number of through channels formed in core | | Average channel diameter, inch | Average length of core after acidizing, inches | Amount of acid neutralized during acidizing, cc. | Permeability of core after acidizing, oil [1] per min. at 1 lb. pressure, cc./min. | Duration of acidizing, mins. | Viscosity of acidizing solution, cps. | |
| --- | --- | --- | --- | --- | --- | --- | --- | --- | --- | --- | --- | --- |
| | | | | inlets | outlets | | | | | | before | after |
| 1 | 150 | 15 | 100 | 5 | 10 | 0.15 | 3½₂ | 18 | 1,750 | 11 | 90 | 90 |
| 2 | 150 | 15 | 200 | 2 | 1 | 0.10 | 3½₂ | 2 | 278 | 14 | 310 | 270 |
| 3 | 150 | 15 | 300 | 3 | 1 | 0.07 | 3½₂ | 2 | 130 | 20 | 1,000 | 600 |
| 4 | 150 | 15 | none | none | none | | ⅝ | 41 | 0.08 | 15 | 0.6 | 5 |
| 5 | 175 | 10 | 200 | 4 | 2 | 0.20 | 3½₂ | 17 | 1,325 | 13 | 200 | 170 |
| 6 | 175 | 10 | none | none | none | | 23⁄32 | 44 | 0.07 | 15 | 0.6 | 2 |
| 7 | 175 | 7.5 | 200 | 2 | 2 | 0.12 | 3½₂ | 8 | 266 | 15 | 210 | 200 |
| 8 | 175 | 7.5 | none | none | none | | 1³⁄₁₆ | 45 | 0.06 | 15 | 0.6 | 1.5 |
| 9 | 190 | 7.5 | 250 | 1 | 1 | 0.25 | 3½₂ | 15 | 990 | 11 | 275 | 250 |
| 10 | 190 | 7.5 | none | none | none | | 1³⁄₁₆ | 45 | 0.06 | 10 | 0.6 | 1.5 |
| 11 | 190 | 5.0 | 250 | 2 | 2 | 0.10 | 3½₂ | 7 | 320 | 12 | 290 | 290 |
| 12 | 190 | 5.0 | none | none | none | | ⅞ | 46 | 0.06 | 10 | 0.6 | 1.2 |

[1] Viscosity of oil 2 cps.

Referring to Table V, it is to be noted that prior to acidizing there were no passages or worm holes in the cores evident to the naked eye. Each core was sound before as well as after acidizing with the gum-containing acid. As a result of the acidizing with the gum-containing hydrochloric acid solution, each of the cores were traversed from end to end with one or more passageways or worm holes as enumerated in the table. In some instances, the passages were sufficiently straight to look through from end to end. Most of the passages were generally more or less crooked but invariably led away from the end of the core through which the acid solution entered and proceeded in a direction more or less parallel to the direction of maximum initial permeability. It will be observed also that a number of advantageous effects is obtained by virtue of the addition of water-insoluble liquid wetted gum to the acid solution. Referring to cores 1, 2 and 3, for instance, it will be noted that the acid solution at 150° F. containing 100 to 300 pounds of gum per 1000 gallons dissolves away only ½₂ inch of the end of the core which is exposed to the acid solution while at the same time several large passageways are formed all the way through the cores and but 4 to 35 percent of the available acid solution becomes neutralized. As a result of the improved acidization, the several passageways formed exhibit from about 21,700 to 1,600 times the flow capacity of the original core for oil. In further comparison under similar test conditions, e. g. core No. 4, conventional gum-free hydrochloric acid dissolves away more than 37 percent of the core and 82 percent of its available HCl becomes neutralized, without forming any channels, and the increase in the flow capacity of the core for oil is only about 1.6 times. Similar passageway formations and increases in flow capacity with low HCl consumption are obtained with the wetted gum-containing acid similarly formulated and used at 175° to 190° F., as shown in the table, while conventional gum-free acid under similar acidizing conditions increases the flow capacity only about 1.25 to 1.4 times with a high consumption of HCl.

In the absence of the water-insoluble liquid wetting of the gum before dispersal in the acid solution, the advantageous effects of channeling or worm-hole formation herein described are not had. For example, the gum-acid mixture obtained by dispersing 0.5 percent of gum karaya directly (without previous wetting with non-aqueous liquid) in 15 percent hydrochloric acid, by stirring the acid for 5 minutes with a propeller-type stirrer after depositing the gum in the acid solution, produces no channels in the core at 150° F. and increases the permeability but slightly, although 90 percent of the acid becomes neutralized when used in the same manner as in the tests of Table V. When the concentration of the gum-acid mixture with the gum similarly directly dispersed in the acid is raised to 1.7 percent, no permeability increase is had and the amount of acid neutralized decreases to 28 percent. With 3 percent of gum similarly used, the permeability of the core is decreased and the percent of acid neutralized is reduced to 10 in 20 minutes of acidizing time. With 10 percent of gum similarly used, the permeability of the core is still further decreased and only 5 percent of the acid becomes neutralized in 20 minutes of acidizing time.

Another of the advantages of wetting the gum with a non-aqueous liquid before dispersal in the acid solution is that the resulting acid solution has a high filtration rate as measured in the equipment described in API Code No. 29, Second Edition, July 1942 (tentative) and the gum does not filter out of the solution. This is evident in the following comparison using as a blank gum karaya dispersed directly in the acid solution which results in a low filtration rate. For example, as the blank 3 percent by weight of gum karaya is dispersed directly (without prior moistening with any liquid) by vigorous stirring for 5 minutes using a motor driven propeller-type stirrer in 15 percent hydrochloric acid solution. The result is a gelled acid-gum mixture having a viscosity of 500 centipoises (Brookfield) at room temperature and an API filtration rate of 7½ cc. in 30 minutes. In comparison, the dispersion in 15 percent hydrochloric acid of 2.75 percent by weight of gum karaya moistened with an equal weight of kerosene, in accordance with the invention, by similarly stirring the kerosene-wetted gum acid mixture for 5 minutes produces a gum-acid dispersion having a viscosity of 1000 centipoises at room temperature and an API filtration rate of 100 cc. in less than 2 minutes. In this test, the gum-acid mixture prepared in accordance with the invention passes completely through the filter (which is a No. 50 or 52 Whatman filter paper) without separation of the gum from the acid solution. On the other hand, if the step of moistening the gum with the non-aqueous liquid is omitted prior to dispersing the gum in the acid solution, the gum filters out of the gum-acid mixture as it is subjected to filtration in the above designated API filtration test. Hence, the gum-acid mixtures of the present invention do not plug the pores of the earth formation. Since the gum does not become separated from the acid solution there is usually no need for a subsequent injection of acid.

An especial advantage of the non-aqueous liquid-wetted gum-acid mixture as herein set forth is its ability to carry sand or like particulated propping agent in suspension as when the mixture is injected under pressures which are calculated to be sufficient to produce fracturing, cracking or lifting of the earth formation. The herein described mixtures readily hold in suspension as much sand as may be tolerated by the pumping equipment used to inject the mixture into the well formations, e. g. up to 3 or 4 pounds per gallon of the mixture.

This application is a continuation-in-part of our co-pending application Serial No. 272,268, filed February 18, 1952, now abandoned.

We claim:

1. In a method of acidizing an earth formation penetrated by the bore of a well, the step which consists in injecting into the earth formation through the well bore an aqueous solution containing hydrochloric acid and having a gum dispersed therein, said gum being selected from the group consisting of karaya, carrageenin, psyllium seed, ghatti, tragacanth, pershir, and shiraz in amount between about 1.1 percent and 8 percent of the weight of the acid solution, and said gum on being dispersed in the aqueous solution having in admixture a non-aqueous water-insoluble liquid inert to the gum in amount sufficient to moisten the gum with the said non-aqueous liquid.

2. In a method according to claim 1 in which the amount of the gum is between 2.7 and 8 percent and pressure is applied to the aqueous solution in amount exceeding the pressure per unit area of the overburden of the earth formation adjacent to the well.

3. In a method according to claim 1 in which the gum is karaya.

4. In a method according to claim 1 in which the gum is carrageenin.

5. In a method according to claim 1 in which the gum is psyllium seed.

6. In a method according to claim 1 in which the gum is tragacanth.

7. In a method according to claim 1 in which the gum is pershir.

8. In a method according to claim 1 in which the gum is karaya and the non-aqueous liquid is a petroleum fraction.

9. In a method according to claim 1 in which the injection of the hydrochloric acid containing the gum is followed by an injection of between 1 and 25 times as much in volume of gum-free hydrochloric acid solution containing 2 to 25 percent of HCl.

10. In a method according to claim 1 in which the percent by weight of HCl in the aqueous solution containing the HCl and gum is 2 to 25 percent, and the amount of gum is 1.1 to 2.7 percent of the weight of the aqueous solution.

11. In a method according to claim 1 in which the percent by weight of the HCl in the aqueous solution containing the HCl and gum is 2 to 25 percent and the amount of gum is 2.7 to 8 percent of the weight of the aqueous solution.

12. In a method according to claim 2 in which the injection of the gum-containing aqueous solution is followed by an injection of gum-free aqueous hydrochloric acid solution containing from 2 to 25 percent of HCl.

13. In a method according to claim 11 in which the injection of the gum-containing aqueous solution is followed by an injection of gum-free aqueous hydrochloric acid solution containing from 2 to 25 percent of HCl.

14. A method of preparing a composition for acidizing wells which comprises moistening a water-soluble gum selected from the group consisting of karaya, carrageenin, psyllium seed, ghatti, tragacanth, pershir, and shiraz with a non-aqueous water-insoluble liquid inert to the gum and substantially undecomposed by hydrochloric acid so as to coat the particles of the gum with the liquid, and mixing the resulting liquid-treated gum with hydrochloric acid solution containing from 2 to 25 percent of HCl whereby the gum forms a uniform dispersion in the acid solution capable of passing through a No. 50 Whatman filter paper without separation of the gum from the acid solution.

15. A method according to claim 14 in which the non-aqueous liquid is a petroleum fraction.

16. A method according to claim 15 in which the non-aqueous liquid is a chlorinated hydrocarbon having a molecular weight between 85 and 300.

17. A method according to claim 14 in which the non-aqueous liquid is a substantially water-insoluble ketone having a carbon atom to oxygen atom ratio of 5 to 11 and a molecular weight between 85 and 175.

18. A method according to claim 14 in which the non-aqueous liquid is a substantially water-insoluble alcohol having a carbon atom to oxygen atom ratio of 5 to 11 and a molecular weight between 85 and 175.

19. A composition for acidizing wells comprising aqueous hydrochloric acid containing from 2 to 25 percent of HCl having dispersed therein from 1.1 to 8 percent of a water-soluble gum selected from the group consisting of karaya, carrageenin, psyllium seed, ghatti, tragacanth, pershir, and shiraz, the particles of said gum being moistened with a non-aqueous water-insoluble liquid inert to the gum and undecomposed by the acid solution.

20. A composition according to claim 19 in which the non-aqueous liquid is a petroleum fraction.

References Cited in the file of this patent

UNITED STATES PATENTS

| | | |
|---|---|---|
| 2,412,282 | Nelson | Dec. 10, 1946 |
| 2,445,226 | Landers | July 13, 1948 |
| 2,596,137 | Fast | May 13, 1952 |